United States Patent
Alameh et al.

(10) Patent No.: US 10,402,149 B2
(45) Date of Patent: Sep. 3, 2019

(54) ELECTRONIC DEVICES AND METHODS FOR SELECTIVELY RECORDING INPUT FROM AUTHORIZED USERS

(71) Applicant: Motorola Mobility LLC, Chicago, IL (US)

(72) Inventors: Rachid Alameh, Crystal Lake, IL (US); Jarrett Simerson, Glenview, IL (US); Amitkumar Balar, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 26 days.

(21) Appl. No.: 15/835,274

(22) Filed: Dec. 7, 2017

(65) Prior Publication Data

US 2019/0179594 A1    Jun. 13, 2019

(51) Int. Cl.
| G06F 3/16 | (2006.01) |
| G06F 21/32 | (2013.01) |
| H04W 4/02 | (2018.01) |
| G10L 15/26 | (2006.01) |

(52) U.S. Cl.
CPC ............... G06F 3/16 (2013.01); G06F 21/32 (2013.01); G10L 15/26 (2013.01); H04W 4/02 (2013.01)

(58) Field of Classification Search
CPC ............ G06F 3/16; G06F 21/32; H04W 4/02
USPC .............................. 700/94; 704/249; 382/118
See application file for complete search history.

(56) References Cited

U.S. PATENT DOCUMENTS 8,477,175 B2 * 7/2013 Shaffer ................... G06F 3/012
348/14.08

| 2007/0071180 | A1* | 3/2007 | Kanada | G06F 21/316 379/39 |
| 2007/0236330 | A1* | 10/2007 | Cho | G06F 21/305 340/5.54 |
| 2008/0172230 | A1* | 7/2008 | Hayakawa | G10L 17/14 704/249 |
| 2009/0252345 | A1* | 10/2009 | Le | G06F 1/163 381/74 |
| 2011/0257972 | A1* | 10/2011 | Agevik | G06F 16/685 704/235 |

(Continued)

FOREIGN PATENT DOCUMENTS

| WO | 2014/143534 | 9/2014 |
| WO | 2014/158508 | 10/2014 |

OTHER PUBLICATIONS

EXIF Tags—Description and Tools; Published on https://www.sno.phy.queensu.ca/~phil/exiftool/TagNames/EXIF.html; Unknown Publication Date but last revised Feb. 13, 2018.

(Continued)

Primary Examiner — Melur Ramakrishnaiah
(74) Attorney, Agent, or Firm — Philip H. Burrus, IV

(57) ABSTRACT

An electronic device includes one or more sensors having at least an audio sensor and one or more processors. The one or more sensors detect multiple persons within an environment about the electronic device and identify at least one person as an authorized user of the electronic device. The audio sensor receives audio input from the environment, and the one or more processors filter the audio input into authorized user generated audio input and other audio input, record audio signals representing the authorized user generated audio input, and preclude the recording of other audio signals representing to the other audio input.

20 Claims, 6 Drawing Sheets

(56) References Cited

U.S. PATENT DOCUMENTS

| | | | | |
|---|---|---|---|---|
| 2013/0194238 A1* | 8/2013 | Sakai | ............... | H04N 21/4314 |
| | | | | 345/175 |
| 2013/0222271 A1* | 8/2013 | Alberth | ............... | G06F 1/163 |
| | | | | 345/173 |
| 2015/0049922 A1* | 2/2015 | Miller | ............... | G06K 9/00255 |
| | | | | 382/118 |
| 2015/0340040 A1* | 11/2015 | Mun | ............... | G10L 17/22 |
| | | | | 704/246 |

OTHER PUBLICATIONS

"How to Copyright Photographs", Published on WikiHow; https://www.wikihow.com/Copyright-Photographs ; Exact Publication Date Unknown but prior to filing of present application.

"JPEG Rotation and EXIF Orientation", Instructions published on Impulse Adventure Website; https://www.impulseadventure.com/photo/exif-orientation.html ; Exact Publication Date unknown but prior to filing of present application.

"Logo Licious", Logo Licious—Add your own logo, watermark, and text to photos; App available on GooglePlay; Initial Publication Unknown; Updated Mar. 2, 2018.

Bailey, Jonathan , "Adding Copyright to Exif Automatically", Article Published on website Plagiarism Today; https://www.plagiarismtoday.com/2009/03/26/adding-copyright-to-exif-automatically/ ; Published Mar. 26, 2009.

Doerrfeld, Bill , "20+ Emotion Recognition APIs That Will Leave You Impressed, and Concerned", Blog; Posted at https://nordicapis.com/author/billdoerrfeld/ ; Posted Dec. 31, 2015.

Peters, Richard , "Add copyright info to your photos EXIF", Richard Peters Wildlife Photography; Available at https://www.richardpeters.co.uk/quick-tip-add-copyright-info-to-your-photos-exif/ ; Unknown Publication Date but prior to filing of present application.

Wilhelm, Parker , "Try Google's emotion-detecting image API for yourself", Article published on TechRadar; www.techradar.com; Published Feb. 18, 2016.

* cited by examiner

ELECTRONIC DEVICES AND METHODS FOR SELECTIVELY RECORDING INPUT FROM AUTHORIZED USERS

BACKGROUND

Technical Field

This disclosure relates generally to electronic devices, and more particularly to electronic devices having audio sensors.

Background Art

Modern portable electronic communication devices including numerous features beyond those associated with simply making voice telephone calls. Smartphones, for example, can be used to send text messages or multimedia messages, capture videos, make financial transactions, and surf the Internet. A modern smartphone places more computing power in a pocket than was offered by large desktop computers of only a decade ago.

With all of this computing power, users of such devices are storing more and more personal data in the devices. Health information, password lists, credit card numbers, shopping lists, and the like are routinely stored in a smartphone. It would be advantageous to have an improved device to capture such data.

Figure 1:
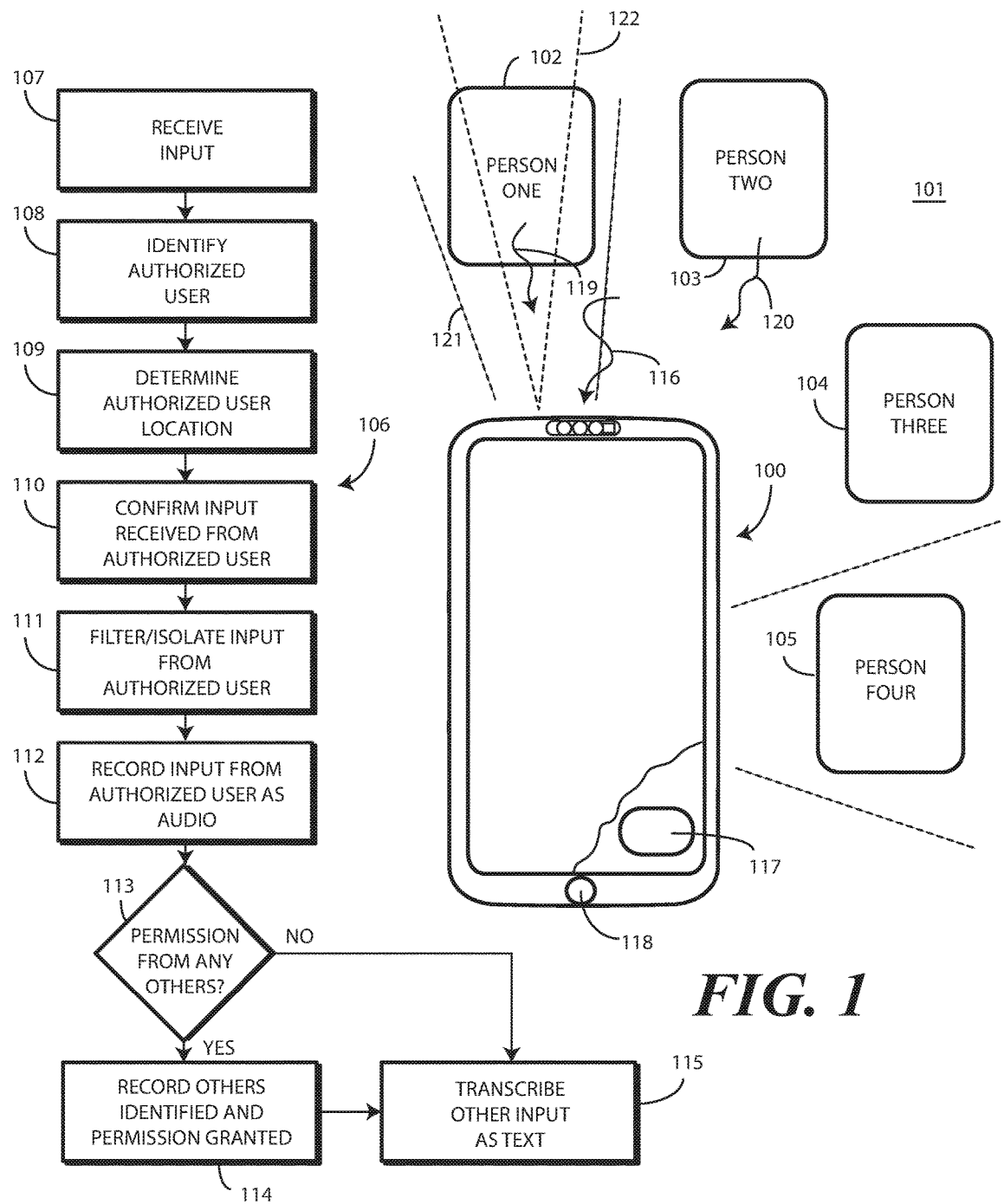
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to identifying an authorized user within an environment of an electronic device and recording audio input from the authorized user while transcribing as text input from non-authorized users. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of selectively recording audio input from authorized users of an electronic device while transcribing, as text, unauthorized persons or persons who have not provided permission to be recorded as described herein. The non-processor circuits may include, but are not limited to, a radio receiver, a radio transmitter, signal drivers, clock circuits, power source circuits, and user input devices. As such, these functions may be interpreted as steps of a method to perform the recording of authorized user audio input while transcribing audio input from third parties. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide electronic devices, and methods for use in the electronic devices, which determine a plurality of persons is situated within an environment of an electronic device. The devices and methods then identify an authorized user within the plurality of persons. This authorized user is distinguished from other users who are unauthorized to use a particular electronic device.

The devices and methods then receive, with an audio sensor, a first audio input emanating from the authorized user and one or more second audio input emanating unauthorized users. One or more processors of the electronic device operable with the audio sensor then record, in a memory of the electronic device, audio input emanating from the authorized user. Since the unauthorized user(s) likely have not given permission to have their voices recorded by the electronic device, in one or more embodiments the methods and devices preclude the recording of the audio input emanating from those unauthorized users. In one embodiment, instead of recording the audio, the input from the unauthorized users is instead transcribed to text. The text can then be stored in the memory of the electronic device. The one or more processors can determine context from this transcribed text to enhance the processing of the authorized user's recorded audio in one or more embodiments.

Illustrating by example, consider a situation where an electronic device configured in accordance with one or more embodiments of the disclosure is placed on a tabletop with a plurality of persons situated about the electronic device. Imaging sensing systems can identify an authorized user form the plurality of persons. A Red-Green-Blue (RGB) imager and an infrared facial depth scanner may capture an image and facial depth scan, respectively, to identify the authorized user using facial recognition techniques for example. Additionally, or alternatively, an audio sensor can detect audio input and can identify the authorized user by comparing audio to predefined audio references stored in memory to perform voice print analysis and so forth.

In one or more embodiments, the electronic device can confirm that select audio input is emanating from the authorized user rather than someone unauthorized to use the electronic device. For example, while audio input is being received, an imaging sensing system may capture video of the authorized user to detect lip movement. Where this lip movement is in synchrony with a given audio input, one or more processors of the electronic device may conclude that the synchronous audio input is emanating from the authorized user. Alternatively to, or in combination with, the lip movement analysis, the electronic device may use a beam steering technique to confirm that audio input is emanating from the authorized user's direction. Other techniques for making this optional confirmation will be described in further detail below. Still others will be obvious to those of ordinary skill in the art having the benefit of this disclosure.

In one or more embodiments, the electronic device can also filter audio input from the authorized user from that of other users when simultaneous audio input is received. The electronic device can optionally match voice characteristics of the authorized user and/or confirm that audio input emanates from the authorized user by confirming a source location of the audio input is emanating from an authorized user location identified by the image sensing system, combined with acoustic reception steering and synchronous lip movement during speech.

In other embodiments, other audio isolation techniques can be used to separate simultaneous speech emanating from different users, as will be appreciated by those of ordinary skill in the art having the benefit of this disclosure. For instance, beam forming, noise selecting, and blind source separation are all techniques that can be used to filter audio input from the authorized user from that of other users when simultaneous audio input is received. Still other techniques will be obvious to those of ordinary skill in the art having the benefit of this disclosure.

In one or more embodiments, the electronic device then records audio signals representing the audio input emanating from the authorized user in memory. At the same time, the electronic device can preclude the recording of audio signals emanating from a non-authorized user. These latter signals can be converted to text and ingested to determine content. However, they are not recorded in one or more embodiments.

Accordingly, embodiments of the disclosure employ techniques such as image recognition and depth assessment to determine a number of people about an electronic device. Embodiments of the disclosure then work to try and determine the identity of persons within a local environment of the electronic device. Embodiments of the disclosure can then mark people who are unknown or unauthorized to use the electronic device. Beam steering can be used to determine the source, location, or position of received audio input. Matching of audio source locations with images of the persons within the environment of the electronic device to associate audio with persons in an image can be used. Synchronization of audio input with lip movement of the persons within the environment of the electronic device to associate audio with persons in an image can be used. Voice print matching by comparing received audio to reference audio stored within the device can be used. Embodiments of the disclosure therefore identify audio input from an authorized user with a high degree of accuracy. Embodiments of the disclosure can then subtract background audio from that emanating from the authorized user to isolate authorized user generated audio input from other audio signals. Authorized user generated audio input can then be recorded, while other audio signals are precluded from being recorded. These other audio signals can be transcribed to text to infer context.

Turning now to FIG. 1, illustrated therein is one explanatory system configured in accordance with one or more embodiments of the disclosure. An electronic device 100 is positioned within an environment 101. A plurality of persons 102,103,104,105 is situated within the environment 101 of the electronic device 100. Here, there are four persons 102,103,104,105 situated within the environment of the electronic device 100. Person 102 is an authorized user of the electronic device 100, while persons 103,104,105 are unauthorized users of the electronic device 100.

The electronic device 100 includes various sensors. These sensors can include an imager system, an audio sensor, proximity detectors, orientation sensors, a location detector, a context sensor, or other sensors. The electronic device 100 also includes on or more processors that are operable with the one or more sensors. In one or more embodiments, the one or more sensors are operable to detect a plurality of persons 102,103,104,105 within a predefined environment 101 about the electronic device 100. As will be described in more detail below, the one or more sensors, in conjunction with one or more processors, can also identifying at least one person 102 of the plurality of persons 103,104,105 as an authorized user of the electronic device 100.

Figure 2:
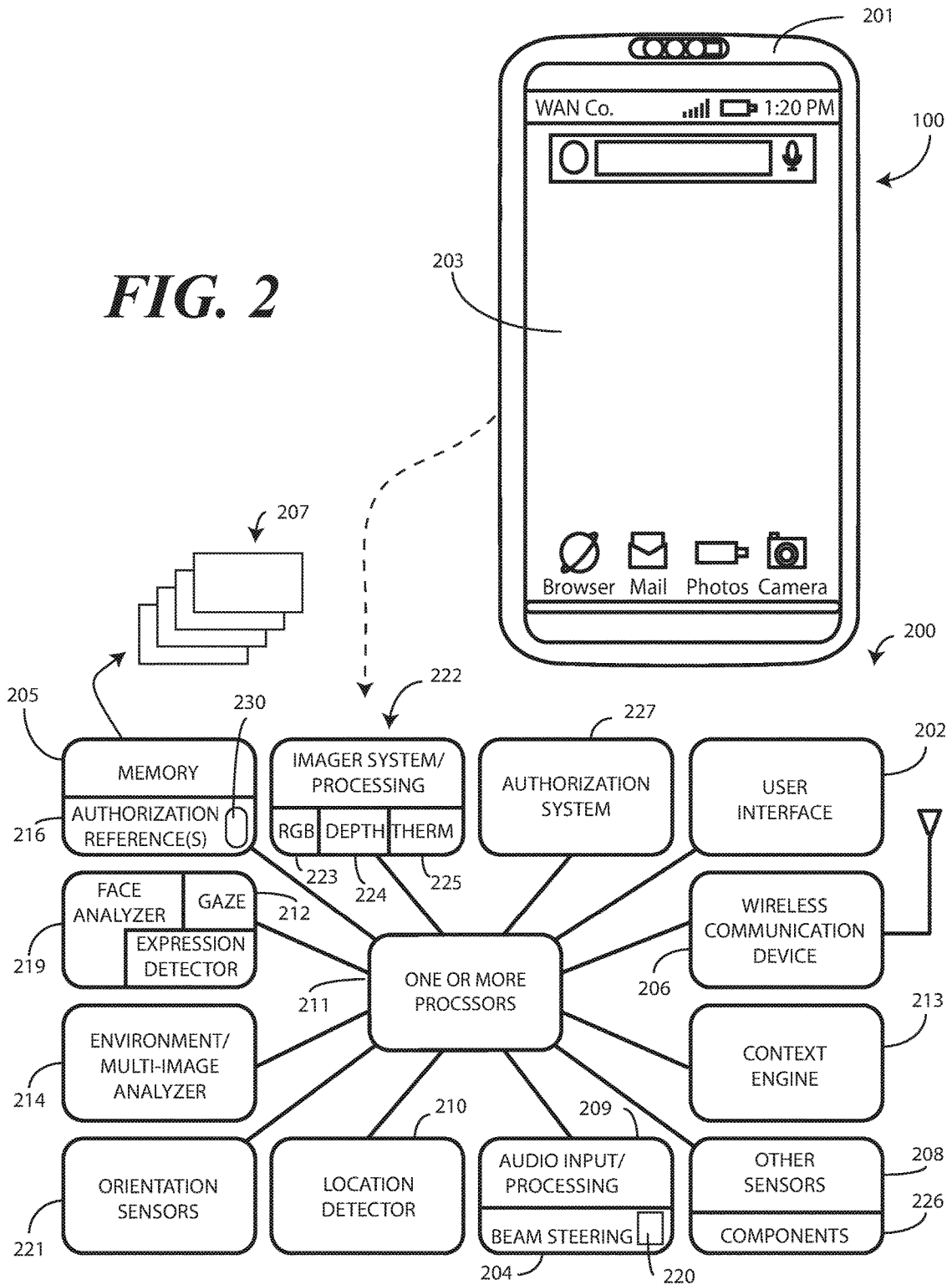
FIG. 2 illustrates one explanatory electronic device in accordance with one or more embodiments of the disclosure.

Turning briefly to FIG. 2, illustrated therein is one explanatory block diagram schematic 200 of the explanatory electronic device 100 of FIG. 1. In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 211. In one embodiment, the one or more processors 211 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 211 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 211 can be responsible for performing the primary functions of the electronic device with which the block diagram schematic 200 is operational. For example, in one embodiment the one or more processors 211 comprise one or more circuits operable with the user interface 202 to present presentation information to a user. The executable software code used by the one or more processors 211 can be configured as one or more modules 207 that are operable with the one or more processors 211. Such modules 207 can store instructions, control algorithms, and so forth.

In one or more embodiments, the block diagram schematic 200 includes an audio input/processor 209. The audio input/processor 209 is operable to receive audio input (116) from an environment (101) about the electronic device 100. The audio input/processor 209 can include hardware, executable code, and speech monitor executable code in one embodiment. The audio input/processor 209 can be operable with one or more predefined authentication references 216 stored in memory 205. With reference to audio input, the predefined authentication references 216 can comprise representations of basic speech models, representations of trained speech models, or other representations of predefined audio sequences that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models stored with the predefined authentication references 216 to identify speech commands.

The audio input/processor 209 can include a beam steering engine 204 comprising one or more microphones 220. Input from the one or more microphones 220 can be processed in the beam steering engine 204 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone, or switching various microphones ON and OFF individually. In one or more embodiments, two or more microphones 220 can be included for selective beam steering by the beam steering engine 204.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 204 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 204 alerting it in which direction to focus the acoustic reception cone and/or steer the first microphone and the second microphone, thereby adding confirmation to audio steering and saving time. Where multiple people are around the electronic device 100, as was the case in FIG. 1, this steering advantageously directs a beam reception cone to the authorized user.

Alternatively, the beam steering engine 204 processes and combines the signals from two or more microphones to perform beam steering. The one or more microphones 220 can be used for voice commands. In response to control of the one or more microphones 220 by the beam steering engine 204, a user location direction can be determined. The beam steering engine 204 can then select between the first microphone and the second microphone to beam steer audio reception toward the user. Alternatively, the audio input/processor 209 can employ a weighted combination of the microphones to beam steer audio reception toward the user.

In one embodiment, the audio input/processor 209 is configured to implement a voice control feature that allows a user to speak a specific device command to cause the one or more processors 211 to execute a control operation. For example, the user may say, "Authenticate Me Now." This statement comprises a device command requesting the one or more processors to cooperate with the authentication system 227 to authenticate a user. Consequently, this device command can cause the one or more processors 211 to access the authentication system 227 and begin the authentication process. In short, in one embodiment the audio input/processor 209 listens for voice commands, processes the commands and, in conjunction with the one or more processors 211, performs a touchless authentication procedure in response to voice input.

The one or more processors 211 can perform filtering operations on audio input (116) received by the audio input/processor 209. For example, in one embodiment the one or more processors 211 can filter the audio input (116) into authorized user generated audio input, i.e., first audio input (119), and other audio input, i.e., second audio input (120).

Various sensors 208 can be operable with the one or more processors 211. A first example of a sensor that can be included with the various sensors 208 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 211, to detect an object in close proximity with—or touching—the surface of the display 203 or the housing 201 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor 208 is a geo-locator that serves as a location detector 210. In one embodiment, location detector 210 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 221 that determines an orientation and/or movement of the electronic device 100 in three-dimensional space. Illustrating by example, the orientation detector 221 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 221 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

The authentication system 227 is operable with the one or more processors 211. A first authenticator 222 of the authentication system 227 can include an imager 223, a depth imager 224, and a thermal sensor 225. In one embodiment, the imager 223 comprises a two-dimensional imager configured to receive at least one image of a person within an environment of the electronic device 100. In one embodiment, the imager 223 comprises a two-dimensional Red-Green-Blue (RGB) imager. In another embodiment, the imager 223 comprises an infrared imager. Other types of imagers suitable for use as the imager 223 of the authentication system will be obvious to those of ordinary skill in the art having the benefit of this disclosure.

The thermal sensor 225 can also take various forms. In one embodiment, the thermal sensor 225 is simply a proximity sensor component included with the other components 226. In another embodiment, the thermal sensor 225 comprises a simple thermopile. In another embodiment, the thermal sensor 225 comprises an infrared imager that captures the amount of thermal energy emitted by an object. Other types of thermal sensors 225 will be obvious to those of ordinary skill in the art having the benefit of this disclosure.

Figure 3:
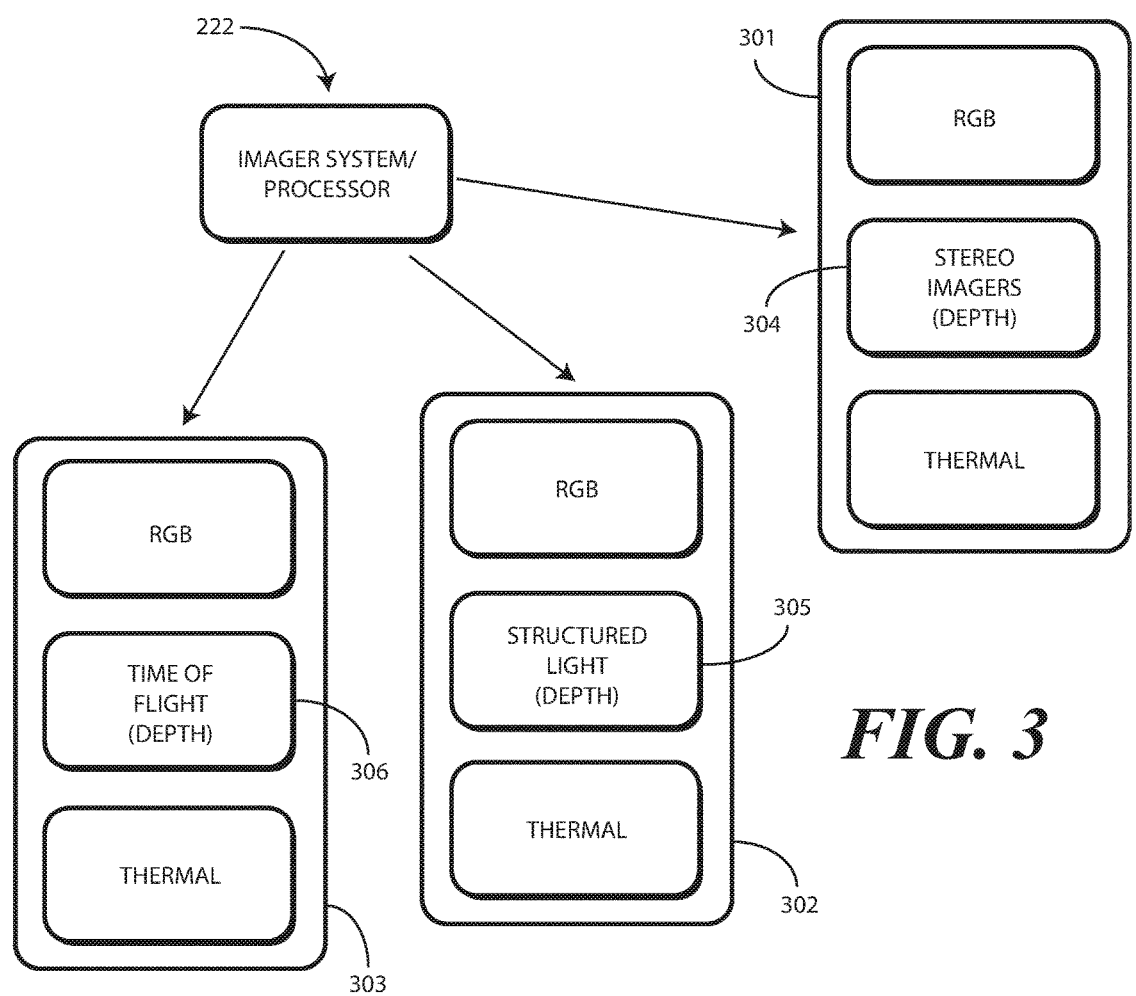
FIG. 3 illustrates various explanatory imaging systems suitable for use with explanatory electronic devices in accordance with one or more embodiments of the disclosure.

The depth imager 224 can take a variety of forms. Turning briefly to FIG. 3, illustrated therein are three different configurations of the first authenticator 222 of the authentication system (227), each having a different depth imager 224.

In a first embodiment 301, the depth imager 304 comprises a pair of imagers separated by a predetermined distance, such as three to four images. This "stereo" imager works in the same way the human eyes do in that it captures images from two different angles and reconciles the two to determine distance.

In another embodiment 302, the depth imager 305 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment 303, the depth imager 306 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 304,305,306 adds a third "z-dimension" to the x-dimension and y-dimension defining the two-dimensional image captured by the imager 222, thereby enhancing the security of using a person's face as their password in the process of authentication by facial recognition.

Turning back to FIG. 2, the authentication system 227 can be operable with a face analyzer 219 and an environmental analyzer 214. The face analyzer 219 and/or environmental analyzer 214 can be configured to process an image or depth scan of an object and determine whether the object matches predetermined criteria by comparing the image or depth scan to one or more predefined authentication references 216 stored in memory 205.

For example, the face analyzer 219 and/or environmental analyzer 214 can operate as an authentication module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the authentication system 227, can be used as a facial recognition device to determine the identity of one or more persons detected about the electronic device 100.

In one embodiment when the authentication system 227 detects a person, one or both of the imager 223 and/or the depth imager 224 can capture a photograph and/or depth scan of that person. The authentication system 227 can then compare the image and/or depth scan to one or more predefined authentication references 216 stored in the memory 205. This comparison, in one or more embodiments, is used to confirm beyond a threshold authenticity probability that the person's face—both in the image and the depth scan—sufficiently matches one or more of the pre-defined authentication references 216 stored in the memory 205 to authenticate a person as an authorized user of the electronic device 100.

Beneficially, this optical recognition performed by the authentication system 227 operating in conjunction with the face analyzer 219 and/or environmental analyzer 214 allows access to the electronic device 100 only when one of the persons detected about the electronic device 100 are sufficiently identified as an authorized user of the electronic device 100. Accordingly, in one or more embodiments the one or more processors 211, working with the authentication system 227 and the face analyzer 219 and/or environmental analyzer 214 can determine whether at least one image captured by the imager 223 matches a first predefined criterion, whether at least one facial depth scan captured by the depth imager 224 matches a second predefined criterion, and whether the thermal energy identified by the thermal sensor 225 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 211 authenticate a person as an authorized user of the electronic device 100 when the at least one image matches the first predefined criterion, the at least one facial depth scan matches the second predefined criterion, and the thermal energy matches the third predefined criterion.

In one or more embodiments, a user can "train" the electronic device 100 by storing predefined authentication references 216 in the memory 205 of the electronic device 100. Illustrating by example, a user may take a series of pictures. They can include identifiers of special features such as eye color, sink color, air color, weight, and height. They can include the user standing in front of a particular wall, which is identifiable by the environmental analyzer from images captured by the imager 223. They can include the user raising a hand, touching hair, or looking in one direction, such as in a profile view. These can then be stored as predefined authentication references 216 in the memory 205 of the electronic device 100.

A gaze detector 212 can be operable with the authentication system 227 operating in conjunction with the face analyzer 219. The gaze detector 212 can comprise sensors for detecting the user's gaze point. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

The face analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 223 or the depth imager 224 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 226 operable with the one or more processors 211 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 226 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 211 can cause each proximity sensor component to operate at a first "effective" sensitivity so as to receive infrared emissions from a first distance. Similarly, the one or more processors 211 can cause each proximity sensor component to operate at a second sensitivity, which is less than the first sensitivity, so as to receive infrared emissions from a second distance, which is less than the first distance. The sensitivity change can be effected by causing the one or more processors 211 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 226 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 226 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 211. In some embodiments, the one or more processors 211 can control the context engine 213. In other embodiments, the context engine 213 can operate independently, delivering information gleaned from detecting multi-modal social cues, emotional states, moods, and other contextual information to the one or more processors 211. The context engine 213 can receive data from the various sensors. In one or more embodiments, the one or more processors 211 are configured to perform the operations of the context engine 213.

In one or more embodiments, the one or more processors 211 can be operable with the various authenticators of the authentication system 227. For example, the one or more processors 211 can be operable with a first authenticator and a second authenticator. Where more authenticators are included in the authentication system 227, the one or more processors 211 can be operable with these authenticators as well.

Turning now back to FIG. 1, a method 106 for the electronic device 100 is also shown. At step 107, the method 106 receives, with an audio sensor such as the audio input/processor (209) of the electronic device 100, audio input 116 from the environment 101 of the electronic device 100. The receipt of this audio input 116 allows the one or more processors (211) of the electronic device 100 to detect that there is a plurality of persons 102,103,104,105 within the environment 101.

For example, when the audio input 116 includes multiple voices, such as the voice from a man and a voice from a woman, the one or more processors (211) can perform audio processing on the audio input 116 to determine that there are multiple speakers within the environment 101 of the electronic device 100, and therefore, that there are multiple persons 102,103,104,105 within the environment 101 of the electronic device 100.

In one embodiment, step 107 comprises receiving, with the audio sensor of the electronic device 100, a first audio input 119 emanating from the authorized user and a second audio input 120 emanating from at least one unauthorized user. In the illustrative embodiment of FIG. 1, the first audio input 119 emanates from person 102, who is the authorized user, while second audio input 120 emanates from person 103, who is an unauthorized user. The first audio input 119 and the second audio input 120 combine, in this example, to form audio input 116. Determination of number of persons 102,103,104,105 present can also be accomplished by images captured by the imagers in support of audio authentication.

At step 108, the method 106 can identify, using the one or more sensors (208), an authorized user and at least one unauthorized user of the electronic device 100 in the plurality of persons 102,103,104,105. Here, the method 106 can identify that person 102 is an authorized user of the electronic device 100, while persons 103,104,105 are unauthorized users of the electronic device 100. This identification can occur in a variety of ways.

Illustrating by example, in one embodiment the electronic device 100 can perform "touchless" authentication of person 102 as the authorized user in that person 102 need not manipulate or interact with the electronic device 100 using his fingers. To the contrary, in accordance with one or more embodiments of the disclosure, the user is identified and authenticated using a combination of two-dimensional imaging, depth scan imaging, thermal sensing, and optionally one or more higher authentication factors.

For instance, the imager (223) can capture at least one image of any of the persons 102,103,104,105 within the environment 101 of the electronic device 100. Capturing an image of person 102, for example, would capture a picture of the authorized user of the electronic device 100. In one embodiment, the imager (223) captures a single image of the persons 102,103,104,105. In another embodiment, the imager (223) captures a plurality of images of the persons 102,103,104,105. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

In one or more embodiments, the image can be compared to one or more predefined reference images stored in a memory of the electronic device 100. By making such a comparison, the one or more processors (211) can confirm whether the shape, skin tone, eye color, hair color, hair length, and other features identifiable in a two-dimensional image are that of the authorized user identified by the one or more predefined reference images.

In addition to the imager (223) capturing the image, in one or more embodiments a depth imager (224) captures at least one depth scan of the object when situated within the environment 101 of the electronic device 100. In one embodiment, the depth imager (224) captures a single depth scan of the persons 102,103,104,105. In another embodiment, the depth imager (224) captures a plurality of depth scans of the persons 102,103,104,105.

As described above with reference to FIG. 3, the depth imager (224) can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from the electronic device 100 to the various persons 102,103,104,105 and back. Other types of depth imagers will be obvious to those of ordinary skill in the art having the benefit of this disclosure. However, in each case, the depth scan creates a depth map of a three-dimensional object, such as the face of one or more of the persons 102,103,104,105. This depth map can then be compared to one or more predefined facial maps stored in the memory of the electronic device 100 to confirm whether the contours, nooks, crannies, curvatures, and features of the face of any of the persons 102,103,104,105 are that of the authorized user identified by the one or more predefined facial maps.

In one or more embodiments, the image(s) and the depth scan are used in combination for authentication purposes. Illustrating my example, in one or more embodiments one or more processors (211) of the electronic device 100 compare the image with the one or more predefined reference images. The one or more processors (211) then compare the depth scan with the one or more predefined facial maps. Identification and authentication will fail in one or more embodiments unless the image sufficiently corresponds to at least one of the one or more predefined images and the depth scan sufficiently corresponds to at least one of the one or more predefined facial maps. As used herein, "sufficiently" means within a predefined threshold. For example, if one of the predefined images includes five hundred reference features, such as facial shape, nose shape, eye color, background image, hair color, skin color, and so forth, the image will sufficiently correspond to at least one of the one or more predefined images when a certain number of features in the image are also present in the predefined images. This number can be set to correspond to the level of security desired. Some authorized users may want ninety percent of the reference features to match, while other users will be content if only eighty percent of the reference features match, and so forth.

As with the predefined images, the depth scan will sufficiently match the one or more predefined facial maps when a predefined threshold of reference features in one of the facial maps is met. In contrast to two-dimensional features found in the one or more predefined images, the one or more predefined facial maps will include three-dimensional reference features, such as facial shape, nose shape, eyebrow height, lip thickness, ear size, hair length, and so forth. As before, the depth scan will sufficiently correspond to at least one of the one or more predefined facial maps when a certain number of features in the depth scan are also present in the predefined facial maps. This number can be set to correspond to the level of security desired. Some users may want ninety-five percent of the reference features to match, while other users will be content if only eighty-five percent of the reference features match, and so forth.

The use of both the image and the depth scan as combined authentication factors can be better than using one or the other alone. The depth scan adds a third "z-dimension" to the x-dimension and y-dimension data found in the image, thereby enhancing the security of using the face of the authorized user, here person 102, as their password in the process of authentication by facial recognition. Another benefit of using the depth scan in conjunction with the image is the prevention of someone "faking" the imager (223) acting alone by taking an image of a picture of person 102, rather than person 102 themselves. Illustrating by example, if only the imager (223) is used, a nefarious person trying to get unauthorized access to the electronic device 100 may simply snap a picture of a two-dimensional photograph of person 102. The use of a depth scan in conjunction with the image prevents this type of chicanery by requiring that a three-dimensional person 102, i.e., the actual user, be present and within the environment before the authentication system of the electronic device authenticates the person 102 as the authorized user of the electronic device 100.

One or more embodiments of the present disclosure further require a thermal sensor (225) to detect an amount of thermal energy received from one or more of the persons 102,103,104,105 when situated within a thermal reception radius of the electronic device 100. In one or more embodiments, only where the amount of thermal energy received form the object is within a predefined temperature range will authentication occur, and thus access be granted. Advantageously, this prevents the use of three-dimensional masks from "tricking" the authentication system by masquerading as the actual user, i.e., person 102 in this case. Thus, in one or more embodiments, the one or more processors (211) determine whether the amount of thermal energy received from the object, which in this case is person 102, is within the predefined temperature range.

In one or more embodiments, authentication occurs where each of the following is true: the at least one image sufficiently corresponds to at least one of the one or more predefined images; the at least one depth scan sufficiently corresponds to at least one of the one or more predefined facial maps; and the amount of thermal energy received from the object is within the predefined temperature range. Where all three are true, in one or more embodiments, person 102 is authenticated as a user authorized to use the electronic device 100.

In one or more embodiments, when the authentication fails, i.e., where none of the persons 102,103,104,105 is identified and authenticated as the authorized user for whatever reason, the one or more processors (211) can lock or limit full access the electronic device 100 to preclude access to it or the information stored therein. For example, if the at least one image fails to sufficiently correspond to at least one of the one or more predefined images the one or more processors (211) can lock the electronic device 100 to preclude access to it or reduce access or the information stored therein.

Similarly, if the at least one depth scan fails to correspond to at least one of the one or more predefined facial maps, the one or more processors (211) can lock the electronic device 100 to preclude access to it or the information stored therein. If a mask is being used to spoof the system, and the amount of thermal energy received from the object fails to fall within the predefined temperature range, the one or more processors (211) can lock the electronic device 100 to preclude access to it or the information stored therein. When the electronic device 100 is locked, the one or more processors (211) may then require additional authentication factors beyond the image, the depth scan, and the amount of thermal energy to authenticate a user at the next authentication cycle.

As noted above, in one embodiment the imager (223) captures a single image of the persons 102,103,104,105, while in other embodiments the imager (223) captures a plurality of images of the persons 102,103,104,105. Similarly, the depth imager (224) can capture a single depth scan of the persons 102,103,104,105 in one embodiment, while in other embodiments the depth imager (224) captures a plurality of depth scans of the persons 102,103,104,105.

The use of either the plurality of images or the plurality of depth scans advantageously allows additional authentication factors to be integrated into the system. Illustrating by example, the use of either the plurality of images or the plurality of depth scans allows for the detection of movement of the object between instances of either the plurality of images or the plurality of depth scans.

In another embodiment, step 108 of the method 106 can identify the authorized user using a fingerprint sensor 118. The fingerprint sensor 118 can capture a fingerprint image that can be used to authenticate a user of an electronic device 100. As used herein, a fingerprint image refers to a digital image and/or any other type of data representing the print pattern features that distinctly identify a user by a fingerprint of a finger. The fingerprint sensor 118 can also include a presence sensor that periodically detects a presence of a warm object near the fingerprint sensor. In implementations, a fingerprint sensor 118 can also be implemented to detect user presence, rather than implementing a separate presence sensor.

In another embodiment, step 108 of the method 106 can identify the authorized user using a pincode receiver. The pincode receiver can receive a Personal Identification Number (PIN) code or a pass code from a user.

In another embodiment, step 108 of the method 106 can identify the authorized user using a voice recognition engine 117. The voice recognition engine 117 can comprise executable code, hardware, and various voice print templates (also referred to as "voice models"). The voice recognition engine 117 can use the voice print templates to compare a voiceprint from received input and determine if a match exists. In operation, the voice recognition engine 117 obtains voice data using at least one microphone (220) The voice recognition engine 117 can extract voice recognition features from the voice data and generate a voiceprint. The voice recognition engine 117 can compare the voiceprint to at least one predefined authentication reference, which may comprise a predefined voice print template.

In another embodiment, step 108 of the method 106 can identify the authorized user using an iris scanner. The iris scanner can capture images and/or thermal or infrared scans of a person's iris. The iris scanner can employ either or both of visible and near-infrared light. The iris scanner can capture high-contrast images of a person's iris, and can compare these images to one or more predefined authentication references to determine if there is a match to determine that a person is an authorized user of an electronic device 100.

The examples set forth above are merely illustrative of various authenticators that can be used with electronic devices in accordance with one or more embodiments of the disclosure to identify an authorized user at step 108 of the method 106. The authenticators can be used in alone or in combination. The authenticators are illustrative only, and are not intended to provide a comprehensive list of authenticators. Numerous other authenticators will be obvious to those of ordinary skill in the art having the benefit of this disclosure.

Figure 4:
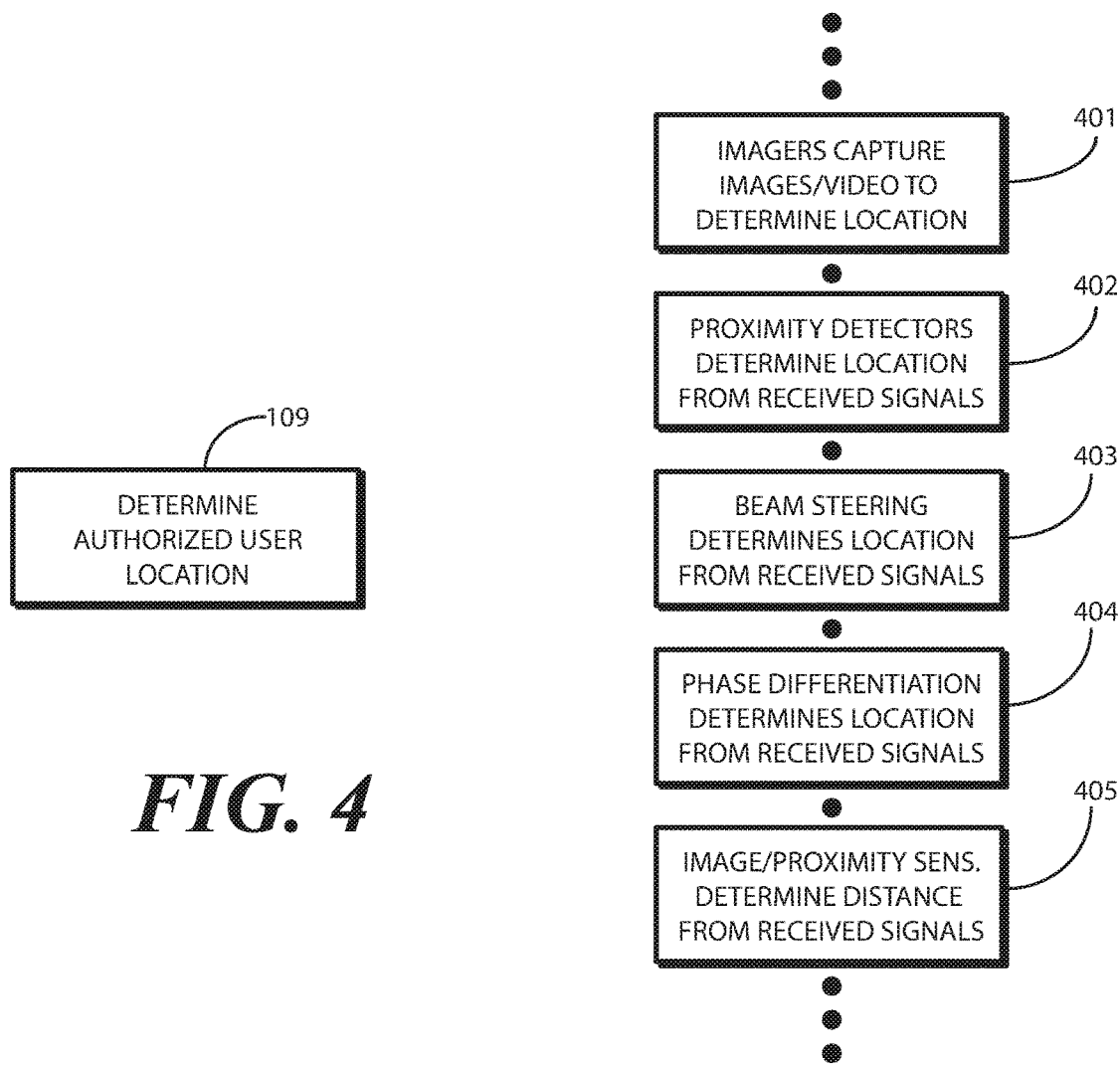
FIG. 4 illustrates one or more method steps for determining a location of an authorized user relative to an electronic device in accordance with one or more embodiments of the disclosure.

At step 109, the method 106 can optionally determine a location of the authorized user relative to the electronic device 100. Said differently, at step 109 the method 106 can identify, with the one or more sensors (208), a spatial location 121 of the authorized user of the electronic device 100. As with the identification process of step 108, the location can be determined in a number of ways. Turning briefly to FIG. 4, illustrated therein are a few illustrative ways step 109 can occur.

At 401, the imager (223) or depth imager (224) can estimate a location of a person's face by capturing images of the environment 101 about the electronic device (100) to determine where person (102) is situated relative to the electronic device (100). The imager (223) can optionally deliver signals to the beam steering engine (204), thereby alerting it in which direction to steer the first microphone and the second microphone. Where multiple persons (102, 103,104,105) are situated around the electronic device (100), this steering advantageously directs a beam reception cone to the authorized user, thereby determining the location of the authorized user.

At 402, one or more proximity sensors can be disposed about the housing of the electronic device (100) to detect the location of the authorized user relative to the electronic device (100). For instance, proximity sensors can be disposed at a corner of the electronic device (100). Each proximity sensor component can comprise a signal receiver, such as an infrared photodiode, to detect an infrared emission from an object external to the housing of the electronic device (100). In one embodiment, no corresponding transmitter is included or required for the proximity sensor component to function. As no active transmitter emitting signals is included, each proximity sensor component is sometimes referred to as a "passive" proximity sensor.

A first set of proximity sensor components can be disposed at a first corner of the electronic device (100), while another set of proximity sensor components can be disposed at a second corner of the electronic device (100). Each proximity sensor component can be disposed about a perimeter of the electronic device (100). In one embodiment, the proximity sensor components are disposed at corners of the electronic device (100). Proximity sensor components can be disposed along the sides of the electronic device (100) as well.

Each proximity sensor component can be disposed behind a grille that defines one or more apertures through which infrared emissions are received. The grille can define one or more reception beams in which infrared emissions can be received. The definition of such reception beams advantageously can enable the proximity sensor components to detect not only the location of an object, e.g., person (102), relative to the electronic device (100), but also whether one or multiple persons (102,103,104,105) are within a thermal detection radius. Embodiments of the disclosure contemplate that there is a high value in not only detecting presence or motion of a user in a 360-degree coverage area provided by the proximity sensor components, but also in determining where the exact user position is relative to electronic device (100). The use of the grille and its corresponding reception beams allows for the detection of multiple persons (102, 103,104,105) within the environment of the electronic device (100), even when those people are close to one another and not just in separate quadrants. The image analysis of 401 and the proximity sensing of 402 can be combined at 405 as well.

At 403, step 109 can be performed acoustically. One or more microphones (220), which comprise a first audio sensor disposed on a first side of the electronic device (100) and a second audio sensor disposed on a second side of the electronic device (100), can beam-steer and acoustic reception cone (122) toward person (102), i.e., to the spatial location (121), for confirmation that at least some of the audio input (116) is coming from person (102).

For example, the electronic device (100) can include a beam steering engine (204) utilizing one or more microphones (220). For example a first microphone can be located on a first side of the electronic device (100) for receiving audio input from a first direction. Similarly, a second microphone can be placed on a second side of the electronic device (100) for receiving audio input from a second direction. The beam steering engine (204) can then select between the first microphone and the second microphone to beam steer audio reception toward an object, such as a user delivering audio input. This can allow the electronic device (100) to determine the location of the authorized user, i.e., person (102).

The beam steering engine (204) processes and combines the signals from two or more microphones to perform beam steering. In response to control of the one or more microphones (220) by the beam steering engine, a user location direction can be determined. The beam steering engine (204) can then select between the first microphone and the second microphone to beam steer audio reception toward the authorized user. Alternatively, the audio input/processor (209) can employ a weighted combination of the microphones to beam steer audio reception toward the user.

At 404, the detecting of step 109 comprises calculating a phase shift between the first audio sensor, i.e., the first microphone, and the second audio sensor, i.e., the second microphone, to confirm the first audio input is received from the spatial location (121) corresponding to the authorized user. The fact that the microphones are spatially separated allows the audio input/processor (209) to assess audio inputs differently based on their locations relative to source locations, their separations, and the resulting phase shifts that each audio input undergoes through the microphones. Said differently, each microphone will respond differently to received audio input based on their separation and source locations for the incoming audio. Accordingly, 404 can include calculating a phase shift between the first audio sensor and the second audio sensor to confirm the first audio input (119) is received from the spatial location (121) corresponding to the authorized user.

Figure 5:
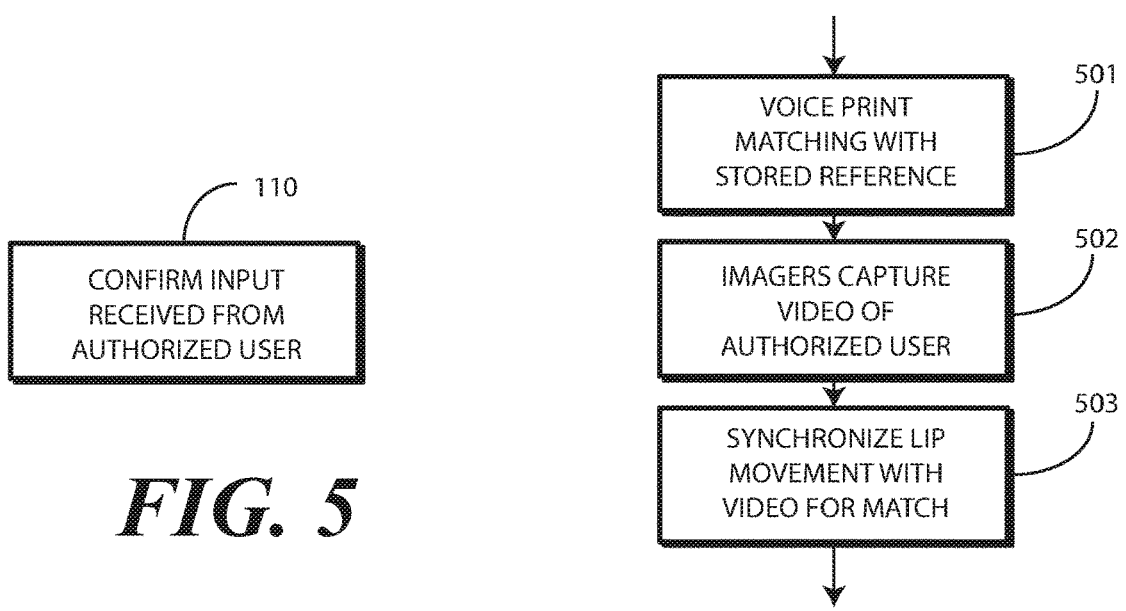
FIG. 5 illustrates one or more method steps for confirming that input received at an electronic device emanates from an authorized user in accordance with one or more embodiments of the disclosure.

Turning now back to FIG. 1, at step 110 the method 106 can confirm whether at least some of the audio input 116 emanates from the authorized user. In one or more embodiments, step 110 comprises detecting that the first audio input 119 is received by the electronic device 100 from the spatial location 121 corresponding to the authorized user. Turning briefly to FIG. 5, illustrated therein are various ways step 110 can occur.

For example, at 501 the aforementioned microphones (220), which comprise a first audio sensor disposed on a first side of the electronic device (100) and a second audio sensor disposed on a second side of the electronic device (100), can beam-steer and acoustic reception cone (122) toward person (102), i.e., to the spatial location (121), for confirmation that at least some of the audio input (116) is coming from person (102). Voiceprint matching as described above with reference to FIG. 1 can then be performed to determine whether received audio input (116) includes first audio input (119) from an authorized user.

Alternatively, at 502, video or photographs of the face being scanned can be captured to confirm the lips of the face are moving. For example, a depth imager (224) can obtain a depth scan of a face of the authorized user. The one or more processors (211) can then determine whether the depth scan sufficiently corresponds to one or more predefined depth scans stored in the memory (205) of the electronic device (110). Similarly, an imager (223) can obtain an image of a face of the authorized user. The one or more processors (211) can then determine whether the image sufficiently corresponds to one or more predefined images stored in the memory (205) of the electronic device (110).

At 503, analysis of these photographs or video can determine whether the lips are moving in synchrony with the audio input 116. Thus, in one or more embodiments 503 includes capturing, with an imager (423), a plurality of images of the authorized user, processing, with the one or more processors (211), the plurality of images to identify lip movement of the authorized user, and determining, with the one or more processors (211), whether the lip movement is in synchrony with the first audio input (119).

In still other embodiments, facial recognition systems that can read lips, combined with speech recognition, could be used to make sure that what is recorded from the microphones is from the authorized user. Speech recognition would translate audio into text and lip reading would translate what it sees into what it thinks was said. The two outputs could then be compared. Other techniques for determining whether the audio input (116) was received from the authorized user will be described below. Still others will be obvious to those of ordinary skill in the art having the benefit of this disclosure.

Turning now back to FIG. 1, at step 111, and where the received audio input 116 comprises a first audio input 119 from an authorized user and a second audio input 120 from an unauthorized user, the method 106 optionally filters the first audio input 119 from the second audio input 120 to segregate the first audio input 119 from the second audio input 120. This filtering can occur acoustically or spatially.

At step 112, the method 106 records, in the memory (205) of the electronic device 100 the first audio input 119 and precludes the recording of the second audio input 120 in the memory of the electronic device 100. Advantageously, this results in recording audio signals representing the authorized user generated audio input, i.e., first audio input 119, while precluding the recording of other audio signals representing to the other audio input, i.e., second audio input 120. Thus, the authorized user's voice is recorded, while unauthorized users, who likely have not given permission to have their voices recorded, is not.

Where the filtering process of step 111 was unsuccessful in segregating the first audio input 119 from the second audio input 120, in one or more embodiments step 112 comprises precluding the recording of any of the audio input 116. Embodiments of the disclosure contemplate that it can be undesirable to record the voices of persons who have not given permission. Accordingly, where the audio input 116 comprises the first audio input 119 and the second audio input 120, and the filtering is unable to segregate the first audio input 119 from the second audio input 120, step 112 will not record any of the audio input 116. It should be noted that in situations where the audio input 116 comprises only the first audio input 119, the filtering of step 111 and the preclusion of step 112 will be omitted.

At optional decision 113, the method 106 determines whether any other persons, e.g., persons 103,104,105 have given permission to have their voices recorded. Where they have, step 114 can comprise recording signals corresponding to audio received from those users.

For audio input from unauthorized users or those that have otherwise not given permission to have their voices recorded, step 115 comprises transcribing, with the one or more processors (211), the second audio input 120 to transcribed text, and storing, in the memory (205) of the electronic device 100, the transcribed text. Step 115 can further include identifying at least one contextual cue corresponding to the first audio input 119 from the transcribed text. For example, if a name of the authorized user is spoken in the second audio input 120, the one or more processors (211) can infer that the authorized user is having a conversation with that person rather than delivering user commands to the electronic device 100.

Thus, as shown and described with reference to FIG. 1, when audio sensors such as the one or more microphones (220) receive audio input 116 from the environment 101 about the electronic device 100, the one or more processors (211) optionally filter the audio input 116 into authorized user generated audio input and other audio input at step 111. At step 112, the one or more processors 211 record audio signals representing the authorized user generated audio input, i.e., audio signals representing first audio input 119. Additionally, the one or more processors at step 112 preclude the recording of other audio signals representing to the other audio input, i.e., other audio signals representing second audio input 120. They do this until permission is received to record these other audio signals as determined at decision 113. Until then, the one or more processors (211) transcribe the other audio signals to transcribed text and store the transcribed text in the memory (205).

The one or more processors (211) can optionally, at step 110, confirm the authorized user generated audio input emanates from the authorized user prior to the recording of the audio signals at step 112. As previously described, this confirmation can occur by determining whether the authorized user generated audio input sufficiently corresponds to at least one predefined audio signal stored in the memory. Alternatively, it can occur by determining, with the one or more sensors (208), a spatial location 121 of the authorized user relative to the electronic device 100, and determining whether the authorized user generated audio input is received within an acoustic reception cone 122 aligned with the spatial location 121. In still other embodiments, it can occur when the imager (223) a plurality of images of the authorized user, processing the plurality of images to identify lip movement of the authorized user, and determining whether the lip movement is in synchrony with the authorized user generated audio input. Other techniques will be obvious to those of ordinary skill in the art having the benefit of this disclosure.

Figure 6:
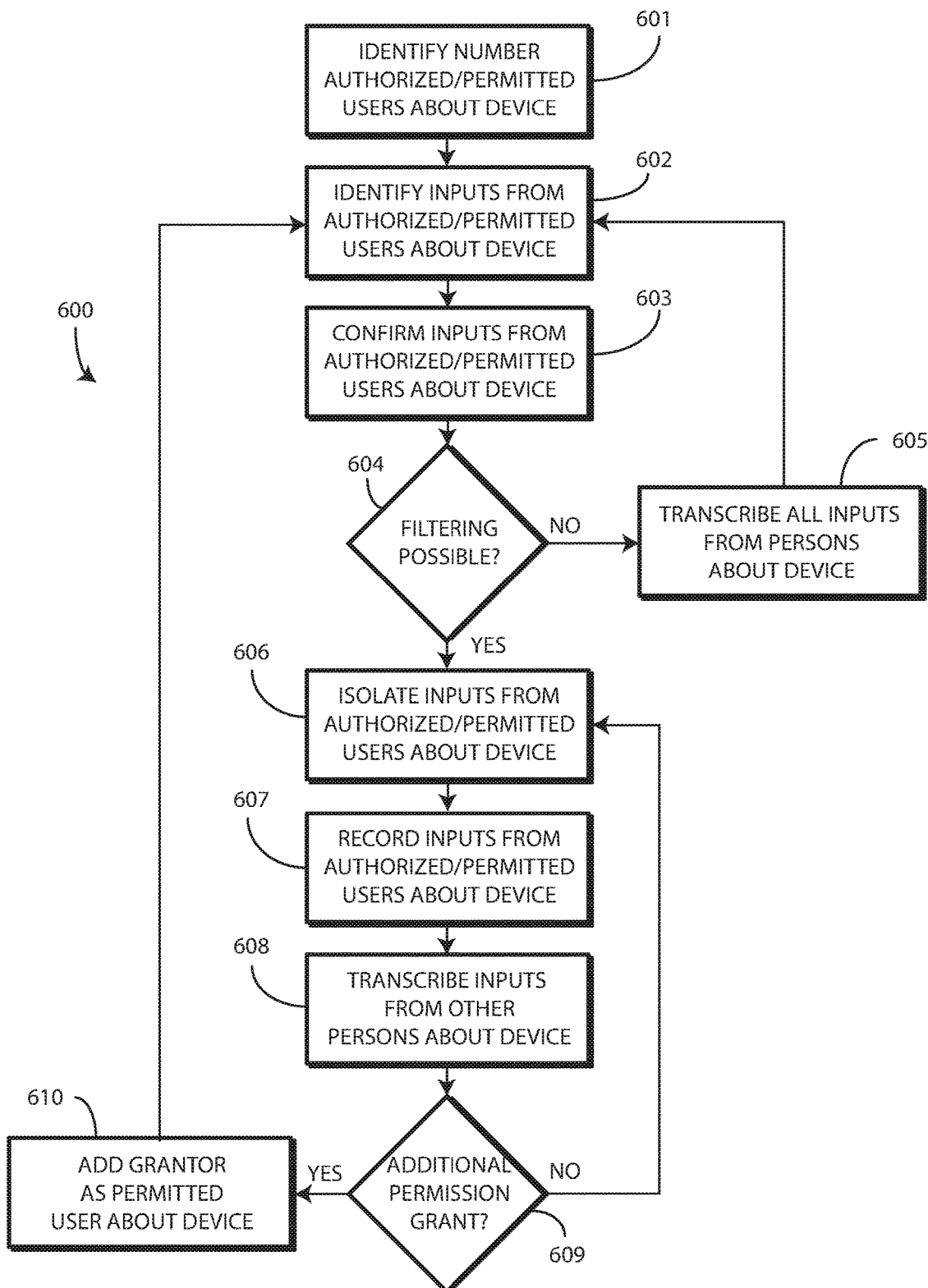
FIG. 6 illustrates one explanatory method in accordance with one or more embodiments of the disclosure.

Turning now to FIG. 6, illustrated therein is another method 600 in accordance with one or more embodiments of the disclosure. At step 601, the method 600 identifies a number of persons situated about an electronic device. In one embodiment, this occurs where the electronic device includes four proximity sensor components disposed at corners of the electronic device. Each proximity sensor component is disposed behind a grille defining a plurality of reception beams.

Each set of reception beams defines a corresponding cumulative beam reception angle. In one embodiment, the cumulative beam reception angle of any one proximity sensor component overlaps the cumulative beam reception angle of at least one other proximity sensor component. This overlap defines a number of zones from which infrared emissions can be received. The definition of these zones allows one or more processors of the electronic device to determine where one or more persons may be located about the electronic device. Alternatively, an imager can simply capture a picture to determine how many people are situated about a predefined environment of the electronic device.

At step 602, the method 600 receives, with an audio sensor of an electronic device, audio input from an environment about the electronic device. At step 602, the method 600 further identifies, with the one or more processors, one of the first audio input or the second audio input as emanating from an authorized user of the electronic device and another of the first audio input or the second audio input as emanating from a source other than the authorized user of the electronic device.

At step 603, the method 600 confirms that the one of the first audio input or the second audio input is emanating from an authorized user of the electronic device. At decision 604, the method determines whether it is possible to filter the one of the first audio input or the second audio input emanating from an authorized user of the electronic device from other audio inputs received by the electronic device. Where it is, step 606 comprises filtering, with one or more processors operable with the audio sensor, the audio input into at least a first audio input and a second audio input. Where it is not, step 605 comprises transcribing all audio input.

Step 607 comprises recording, with the one or more processors, audio signals representing the one of the first audio input or the second audio input and precluding the recording of the another of the first audio input or the second audio input. Step 608 comprises transcribing, with the one or more processors, the another of the first audio input or the second audio input as transcribed text, and storing the transcribed text in a memory of the electronic device.

Decision 609 determines whether user input authorizing recording of audio input from at least a second person within the environment of the electronic device. Where it has, step 610 comprises filtering the another of the first audio input or the second audio input to segregate a third audio input emanating from the second person and recording audio signals representing the third audio input.

Figure 7:
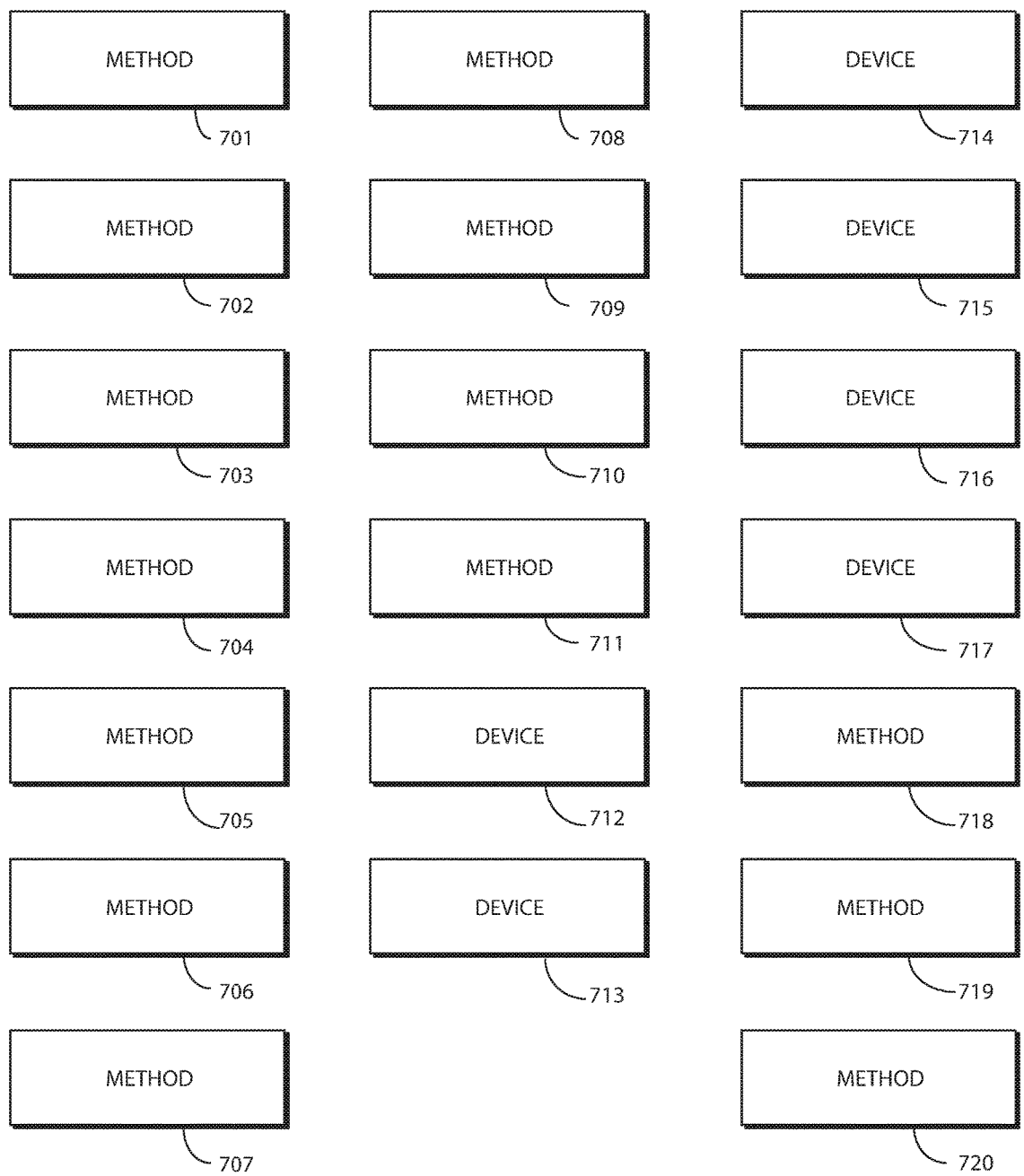
FIG. 7 illustrates one or more embodiments of the disclosure.

Turning now to FIG. 7, illustrated therein are various embodiments of the disclosure. At 701, a method comprises determining, with one or more sensors of an electronic device, a plurality of persons within an environment of the electronic device. At 701, the method includes identifying, with the one or more sensors, an authorized user and at least one unauthorized user of the electronic device in the plurality of persons. At 701, the method includes receiving, with an audio sensor of the electronic device, a first audio input emanating from the authorized user and a second audio input emanating from the at least one unauthorized user. At 701, the method comprises, with one or more processors operable with the one or more sensors and the audio sensor, recording, in a memory of the electronic device, the first audio input and precluding the recording of the second audio input in the memory of the electronic device.

At 702, the method of 701 further comprises transcribing, with the one or more processors, the second audio input to transcribed text, and storing, in the memory of the electronic device, the transcribed text. At 703, the method of 701 further comprises confirming, with the one or more processors and prior to the recording, the first audio input emanates from the authorized user.

At 704, the confirming of 703 comprises identifying, with the one or more sensors, a spatial location of the authorized user relative to the electronic device and detecting the first audio input is received from the spatial location. At 705, the confirming of 704 comprises beam steering an acoustic reception cone of the audio sensor to the spatial location. At 706, the confirming of 704 comprises, wherein the audio sensor comprises a first audio sensor disposed on a first side of the electronic device and a second audio sensor disposed on a second side of the electronic device, calculating a phase shift between the first audio sensor and the second audio sensor to confirm the first audio input is received from the spatial location. At 707, the confirming of 704 comprises capturing, with an imager, a plurality of images of the authorized user, processing, with the one or more processors, the plurality of images to identify lip movement of the authorized user, and determining, with the one or more processors, whether the lip movement is in synchrony with the first audio input.

At 708, the confirming of 703 comprises performing, with a depth scanner, a depth scan of a face of the authorized user and determining whether the depth scan sufficiently corresponds to one or more predefined depth scans stored in the memory of the electronic device. At 709, the method of 701 further comprises filtering, with the one or more processors, the first audio input from the second audio input to segregate the first audio input from the second audio input. At 710, when the filtering of 709 fails to segregate the first audio input from the second audio input, the method of 701 comprises precluding the recording of the first audio input. At 711, the method of 702 further comprises identifying at least one contextual cue corresponding to the first audio input from the transcribed text.

At 712, an electronic device comprises one or more sensors comprising an audio sensor and one or more processors operable with the one or more sensors. At 712, the one or more sensors detect a plurality of persons within a predefined environment about the electronic device and identify at least one person of the plurality of persons as an authorized user of the electronic device. At 712, the audio sensor receives audio input from the predefined environment about the electronic device, and the one or more processors filter the audio input into authorized user generated audio input and other audio input, record audio signals representing the authorized user generated audio input, and preclude the recording of other audio signals representing to the other audio input.

At 713, the electronic device of 712 comprises a memory. At 713, the one or more processors of 712 further transcribe the other audio signals to transcribed text and store the transcribed text in the memory.

At 714, the one or more processors further confirm the authorized user generated audio input emanates from the authorized user prior to the recording of the audio signals. At 715, the one or more processors confirm the authorized user generated audio input emanates from the authorized user by determining whether the authorized user generated audio input sufficiently corresponds to at least one predefined audio signal stored in the memory. At 716, the one or more processors confirm the authorized user generated audio input emanates from the authorized user by determining, with the one or more sensors, a spatial location of the authorized user relative to the electronic device, and determining whether the authorized user generated audio input is received within an audio reception cone aligned with the spatial location.

At 717, the one or more sensors of 714 comprise a plurality of sensors, with the plurality of sensors comprising an imager. At 717, the one or more processors confirm the authorized user generated audio input emanates from the authorized user by capturing, with the imager, a plurality of images of the authorized user, processing, with the one or more processors, the plurality of images to identify lip movement of the authorized user, and determining, with the one or more processors, whether the lip movement is in synchrony with the authorized user generated audio input.

At 718, a method comprises receiving, with an audio sensor of an electronic device, audio input from an environment about the electronic device. At 718, the method comprises filtering, with one or more processors operable with the audio sensor, the audio input into at least a first audio input and a second audio input. At 718, the method comprises identifying, with the one or more processors, one of the first audio input or the second audio input as emanating from an authorized user of the electronic device and another of the first audio input or the second audio input as emanating from a source other than the authorized user of the electronic device. At 718, the method comprises recording, with the one or more processors, audio signals representing the one of the first audio input or the second audio input and precluding the recording of the another of the first audio input or the second audio input.

At 719, the method of 718 comprises transcribing, with the one or more processors, the another of the first audio input or the second audio input as transcribed text, and storing the transcribed text in a memory of the electronic device. At 720, the method of 718 comprises receiving, with the one or more sensors, user input authorizing recording of audio input from at least a second person within the environment of the electronic device, filtering the another of the first audio input or the second audio input to segregate a third audio input emanating from the second person, and recording audio signals representing the third audio input.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
   determining, with one or more sensors of an electronic device, a plurality of persons within an environment of the electronic device;
   identifying, with the one or more sensors, an authorized user and at least one unauthorized user of the electronic device in the plurality of persons;
   receiving, with an audio sensor of the electronic device, a first audio input emanating from the authorized user and a second audio input emanating from the at least one unauthorized user; and
   with one or more processors operable with the one or more sensors and the audio sensor:
      recording, in a memory of the electronic device, the first audio input; and
      precluding the recording of the second audio input in the memory of the electronic device.

2. The method of claim 1, further comprising transcribing, with the one or more processors, the second audio input to transcribed text, and storing, in the memory of the electronic device, the transcribed text.

3. The method of claim 1, further comprising confirming, with the one or more processors and prior to the recording, the first audio input emanates from the authorized user.

4. The method of claim 3, the confirming comprising:
- identifying, with the one or more sensors, a spatial location of the authorized user relative to the electronic device; and
- detecting the first audio input is received from the spatial location.

5. The method of claim 4, the detecting comprising beam steering an acoustic reception cone of the audio sensor to the spatial location.

6. The method of claim 4, wherein the audio sensor comprises a first audio sensor disposed on a first side of the electronic device and a second audio sensor disposed on a second side of the electronic device, wherein the detecting comprises calculating a phase shift between the first audio sensor and the second audio sensor to confirm the first audio input is received from the spatial location.

7. The method of claim 4, the confirming comprising:
- capturing, with an imager, a plurality of images of the authorized user;
- processing, with the one or more processors, the plurality of images to identify lip movement of the authorized user; and
- determining, with the one or more processors, whether the lip movement is in synchrony with the first audio input.

8. The method of claim 3, the confirming comprising performing, with a depth scanner, a depth scan of a face of the authorized user and determining whether the depth scan sufficiently corresponds to one or more predefined depth scans stored in the memory of the electronic device.

9. The method of claim 1, further comprising filtering, with the one or more processors, the first audio input from the second audio input to segregate the first audio input from the second audio input.

10. The method of claim 9, wherein when the filtering fails to segregate the first audio input from the second audio input, precluding the recording of the first audio input.

11. The method of claim 2, further comprising identifying at least one contextual cue corresponding to the first audio input from the transcribed text.

12. An electronic device, comprising:
- one or more sensors comprising an audio sensor;
- one or more processors operable with the one or more sensors;
- the one or more sensors detecting a plurality of persons within a predefined environment about the electronic device and identifying at least one person of the plurality of persons as an authorized user of the electronic device;
- the audio sensor receiving audio input from the predefined environment about the electronic device;
- the one or more processors:
  - filtering the audio input into authorized user generated audio input and other audio input;
  - recording audio signals representing the authorized user generated audio input; and
  - precluding the recording of other audio signals representing to the other audio input.

13. The electronic device of claim 12, further comprising a memory, the one or more processors further:
- transcribing the other audio signals to transcribed text; and
- storing the transcribed text in the memory.

14. The electronic device of claim 13, the one or more processors further confirming the authorized user generated audio input emanates from the authorized user prior to the recording of the audio signals.

15. The electronic device of claim 14, the one or more processors confirming the authorized user generated audio input emanates from the authorized user by determining whether the authorized user generated audio input sufficiently corresponds to at least one predefined audio signal stored in the memory.

16. The electronic device of claim 14, the one or more processors confirming the authorized user generated audio input emanates from the authorized user by determining, with the one or more sensors, a spatial location of the authorized user relative to the electronic device, and determining whether the authorized user generated audio input is received within an audio reception cone aligned with the spatial location.

17. The electronic device of claim 14, the one or more sensors comprising a plurality of sensors, the plurality of sensors comprising an imager, the one or more processors confirming the authorized user generated audio input emanates from the authorized user by:
- capturing, with the imager, a plurality of images of the authorized user;
- processing, with the one or more processors, the plurality of images to identify lip movement of the authorized user; and
- determining, with the one or more processors, whether the lip movement is in synchrony with the authorized user generated audio input.

18. A method, comprising:
- receiving, with an audio sensor of an electronic device, audio input from an environment about the electronic device;
- filtering, with one or more processors operable with the audio sensor, the audio input into at least a first audio input and a second audio input;
- identifying, with the one or more processors, one of the first audio input or the second audio input as emanating from an authorized user of the electronic device and another of the first audio input or the second audio input as emanating from a source other than the authorized user of the electronic device;
- recording, with the one or more processors, audio signals representing the one of the first audio input or the second audio input; and
- precluding the recording of the another of the first audio input or the second audio input.

19. The method of claim 18, further comprising transcribing, with the one or more processors, the another of the first audio input or the second audio input as transcribed text, and storing the transcribed text in a memory of the electronic device.

20. The method of claim 18, further comprising:
- receiving, with the one or more sensors, user input authorizing recording of audio input from at least a second person within the environment of the electronic device;
- filtering the another of the first audio input or the second audio input to segregate a third audio input emanating from the second person; and
- recording audio signals representing the third audio input.

* * * * *